No. 760,333. PATENTED MAY 17, 1904.
F. HARDENBROOK & W. RICE.
VALVE GEAR FOR EXPLOSIVE ENGINES.
APPLICATION FILED AUG. 28, 1902.
NO MODEL. 3 SHEETS—SHEET 1.
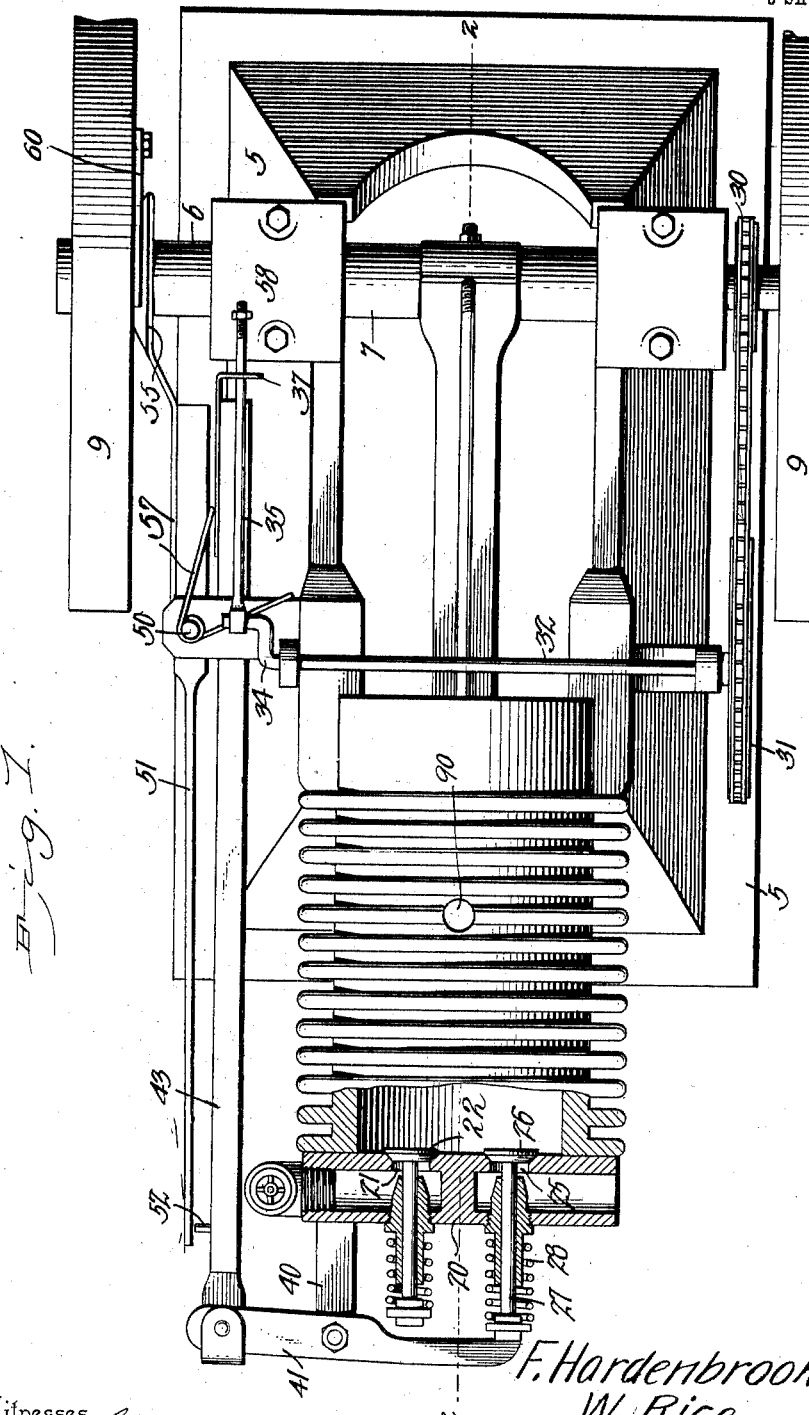
Witnesses
F. Hardenbrook and
W. Rice, Inventors
by
Attorneys

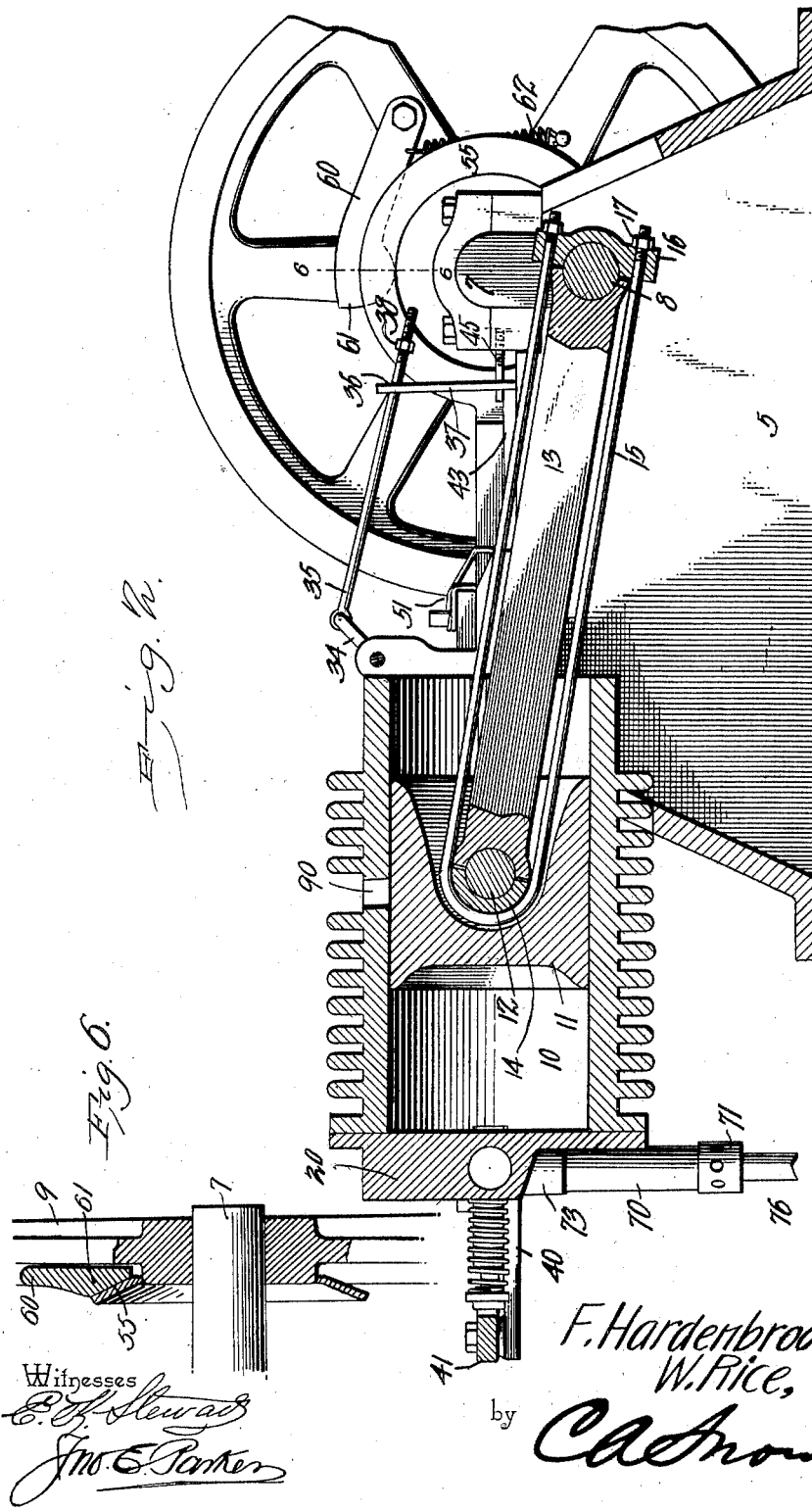

No. 760,333. PATENTED MAY 17, 1904.
F. HARDENBROOK & W. RICE.
VALVE GEAR FOR EXPLOSIVE ENGINES.
APPLICATION FILED AUG. 28, 1902.
NO MODEL. 3 SHEETS—SHEET 3.
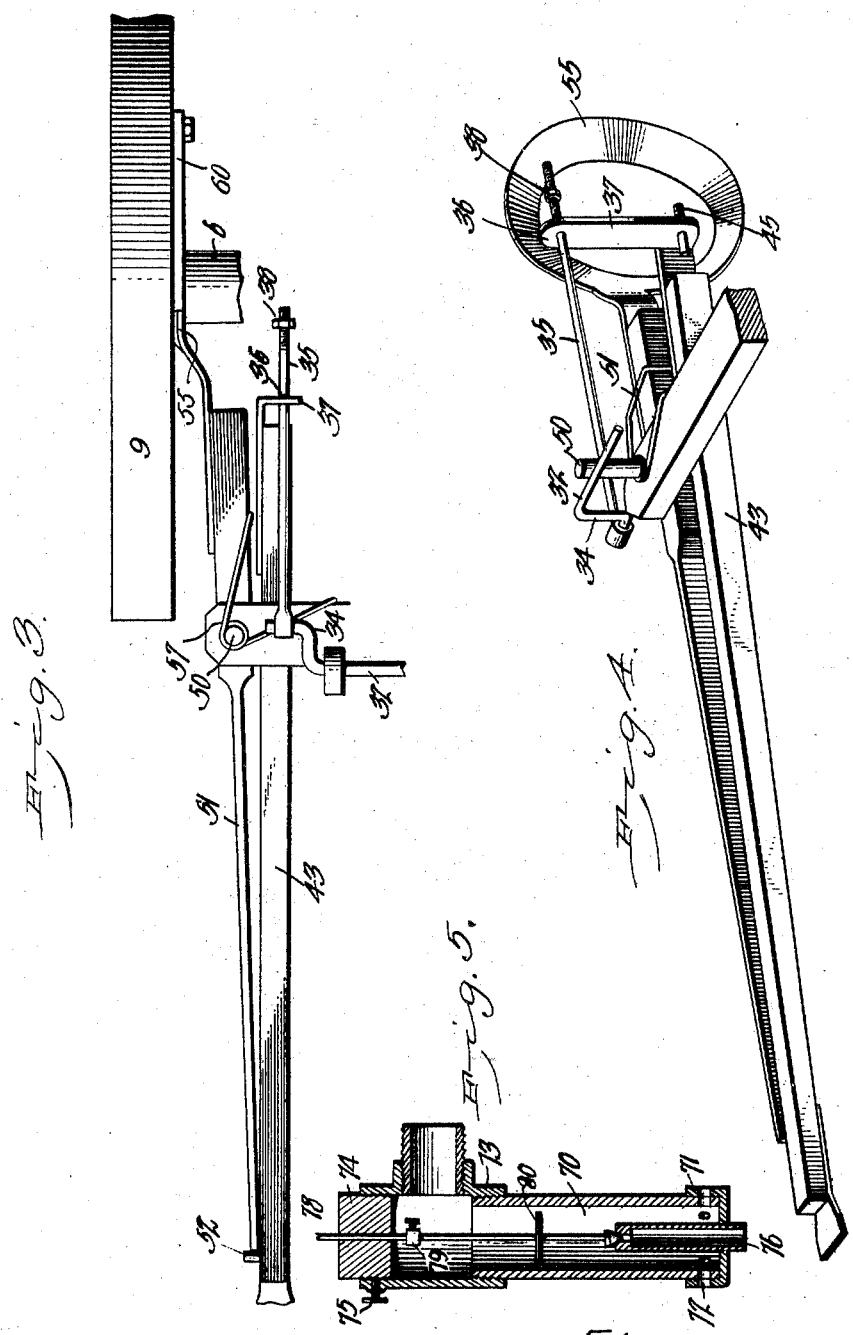

No. 760,333. Patented May 17, 1904.

UNITED STATES PATENT OFFICE.

FRANK HARDENBROOK AND WILLIAM RICE, OF JASPER, MISSOURI.

VALVE-GEAR FOR EXPLOSIVE-ENGINES.

SPECIFICATION forming part of Letters Patent No. 760,333, dated May 17, 1904.

Application filed August 28, 1902. Serial No. 121,363. (No model.)

*To all whom it may concern:*

Be it known that we, FRANK HARDENBROOK and WILLIAM RICE, citizens of the United States, residing at Jasper, in the county of Jasper and State of Missouri, have invented a new and useful Valve-Gear for Explosive-Engines, of which the following is a specification.

This invention relates to certain improvements in explosive-engines, and has for its principal object to provide an improved mechanism whereby the speed of the engine may be regulated to any desired extent by controlling the movement and the position of the exhaust-valve.

A further object of the invention is to provide an improved form of valve-operating mechanism for effecting the opening and closing movement of the main exhaust-valve.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a plan view, partly in section, of a gas-engine constructed in accordance with the invention. Fig. 2 is a longitudinal sectional elevation of the same on the line 2 2 of Fig. 1. Fig. 3 is a plan view illustrating a portion of the valve-operating mechanism in different position from that shown in Fig. 1. Fig. 4 is a detached perspective view of a portion of the valve operating and governing mechanism. Fig. 5 is a detail sectional view of the carbureter. Fig. 6 is a detail sectional view of a portion of the governor on the line 6 6 of Fig. 2.

Similar numerals of reference are employed to indicate corresponding parts throughout the several figures of the drawings.

The bed 5 of the engine is of any ordinary construction and is provided with suitable bearings for the support of a shaft 6, having a pair of cranks 7, connected by a crank-pin 8. The crank-shaft is provided near each end with the usual balance-wheels 9.

Secured to the frame of the engine is a cylinder 10, containing a trunk-piston 11, having a pin 12, which is connected to the crank-pin by a rod 13, of the construction best shown in Fig. 2. Each end of the main portion of the rod is recessed for the reception of one of the pins, and at the piston end the pin 12 is partly surrounded by a block 14, grooved for the reception of a U-shaped bar 15, the opposite ends of which are threaded and pass through suitable openings in a block 16 on the outer side of the crank-pin. On the threaded ends of the rod are adjustable nuts 17, by which wear on any of the parts may be readily taken up and the connecting-rod prevented from working loose. The cylinder-head 20 is provided with a port 21, in which is a suction inlet-valve 22 of the ordinary construction, the valve being opened on the suction-stroke of the piston in the manner usually practiced in four-cycle gas-engines. In the cylinder-head is an exhaust-port 25, normally closed by a valve 26, having a guided stem 27, surrounded by a compression-spring 28, said valve being positively opened by operating mechanism connected to the crank-shaft at the completion or during the exhaust-stroke in order to drive out the exploded charge.

Secured to the main shaft of the engine is a pinion 30, over which passes a link belt intermeshing with a sprocket-wheel 31 on a counter-shaft 32, mounted in suitable bearings on the frame of the engine. The smaller sprocket or pinion is one-half the diameter of the large sprocket-gear and imparts one complete revolution to the latter at each two complete revolutions of the crank-shaft, or four strokes of the piston. At the opposite end of the counter-shaft is a crank 34, to which is connected one end of a rod 35, the opposite end of which passes loosely through a guiding-opening 36 in a vertically-disposed arm 37. The extreme end portion of the rod 35 is threaded for the reception of a nut 38, which may be adjusted to come into contact with the upright arm 37 at any desired point in the stroke of the crank 34, the crank and rod 35 serving to impart movement to the arm in but one direction.

To the head 20 of the cylinder is secured a bracket 40, on which is fulcrumed a horizontal lever 41, adapted to engage with the stem 27 of the exhaust-valve and open said valve during the exhaust-stroke of the piston, or at or near the completion of said exhaust-stroke. The opposite end of the lever is connected by a rod 43 to a forwardly-extending member of the upright arm 37, to which it is rigidly connected, the rod being moved by the crank 34 and serving to open the exhaust-valve 26 at the proper time to permit the escape of the exploded gases. The arm 37 is partly guided by a pin 45, having a threaded end adapted to a threaded opening in one of the crank-shaft bearing-blocks and adjustable longitudinally thereof, this pin also serving as a stop to limit the inward movement of the connecting-rod 43, the latter being returned to its initial position after each operation by means of the compression-spring 28 around the stem of the exhaust-valve. In the ordinary operation of this portion of the mechanism the counter-shaft 32 is revolved and turns the crank 34, the latter acting through the rod 35 to move the rod 43 endwise and open the exhaust-valve through the pivoted lever 41, the exhaust-valve being maintained open for a desired period of time to permit the escape of the exploded charge. The opening movement of the exhaust-valve is governed primarily by the proper adjustment of the positions of the main crank-pin and the crank 34, further adjustment being accomplished by setting the nut 38 on the threaded end of the rod 35 to effect the operative movement of the valve at the proper time and to limit the length of time which said valve remains open.

In order to properly govern the speed of the engine, provision is made for maintaining the exhaust-valve open after the exploded charge has been expelled in case the speed of the engine is in excess of the normal. When the exhaust-valve is held open during the next succeeding or suction stroke of the piston, the piston will draw air into the cylinder instead of drawing in the explosive charge through the inlet-port, the closing-spring of the latter offering sufficient resistance to prevent the opening of the valve and admittance of the explosive mixture.

At one side of the engine-frame is a vertically-disposed standard 50, forming a fulcrum for a lever 51, which extends parallel with the connecting-rod 43 and which may be moved inwardly to the position shown in Fig. 3 until its outer end is in engagement with a pin or lug 52, projecting from one side of said rod. The rear end of the lever 51, or that end adjacent to the crank-shaft, is provided with a ring 55, encircling the crank-shaft, and provided with an inclined face adjacent to one of the balance-wheels and normally held against the balance-wheel by a suitable torsion-spring 57, extending around the standard 50 and having one end connected to a fixed point and the opposite end bearing against the lever 51. On the balance-wheel is pivoted a governor-arm 60, the free end of which is weighted, the weight being inclined or of wedge shape in cross-section and adapted to engage the inclined face of the ring 55 and force the same outwardly from the balance-wheel until the free end of the lever 51 is in the position shown in Fig. 1 and out of the path of movement of the pin or lug 52, carried by the rod 43. The movement of the weighted lever in this respect is aided by a tension-spring 62, connected at one end to the balance-wheel and at its opposite end to the governor-lever and serving to draw the weighted end of the same into contact with the ring 55. In the operation of this portion of the mechanism the free end of the lever 51 remains in the position shown in Fig. 1 while the engine is running at a normal rate of speed. Should this speed be increased, the governor-lever 60 is thrown outwardly under the influence of centrifugal force and moves out of contact with the inclined face of the ring 55, permitting the torsion-spring 57 to move the free end of the lever 51 into the path of the pin or lug 52, the latter being stopped by contact with the end of the lever and holding the exhaust-valve open until the speed of the engine is reduced and the governor-lever again moves the lever 51 out of contact with said pin. In this manner the exhaust-port may be retained open and atmospheric air or a portion of the exploded charge drawn into the engine on the suction-stroke, so that when the electrodes or other igniting devices are operated no explosion will occur.

Referring now to Fig. 5, 70 represents a preferably cylindrical chamber having at its lower end a cap 71, in which are formed a number of openings 72, which may be moved into alinement with corresponding openings in the casing 70, said openings serving to admit air to the interior of the casing and the quantity of air so admitted being regulated by turning the cap-piece to a greater or less extent. The upper end of the casing 70, which may be formed of a section of pipe, is connected to a T-joint 73, which is coupled to the inlet-port of the cylinder-head. The upper end of the coupling is closed by an adjustable plug 74, adapted to the threaded end of the coupling, said plug when adjusted to proper position being locked by a suitable set-screw 75, extending through the T-joint. The lower cap 71 is provided with an opening through which passes a small tube 76, leading from a supply-tank containing gasolene or similar hydrocarbon, said tube having at its upper end a valve-seat 77 for the reception of a needle-valve on the lower end of a rod 78, which passes through a guiding-opening in the plug 74 and is freely movable therein. On the rod 78 is an adjustable nut or collar 79, adapted to make contact with the lower face of the plug 74 to limit the extent of the needle-valve, and the adjustment of the plug permits of the proper regulation of this opening movement to govern the quantity of gasolene introduced into the mixing-chamber within the casing 70 at each operation. Secured to the lower portion of the rod 78 is an enlarged collar or flange 80 in the path of the current of air entering through the openings 72. In the operation of this portion of the mechanism the suction-stroke of the piston will create a slight vacuum between the cylinder-head and the piston which results in the opening of the suction inlet-valve. Air is drawn in through the opening 72, and its rapid passage into and through the mixing-chamber causes it to strike against the collar or flange 80 and open the needle-valve, admitting a quantity of gasolene to be mixed with the air and drawn into the cylinder to form an explosive mixture, and the quantity of air and quantity of gasolene admitted to the mixing-chamber may be accurately regulated.

On reference to Figs. 1 and 2 it will be noted that the cylinder is provided with an opening 90 at a point adjacent to the limit of outstroke of the piston, this opening placing the interior of the casing in communication with the outer air at the completion of each stroke. At the end of an explosion or working stroke this opening is uncovered to permit the escape of the products of combustion, a greater or less quantity escaping in accordance with the size of the opening and the speed of travel of the piston. One advantage gained from this preliminary exhaust is that there will be little or no pressure in the cylinder to resist the opening movement of the exhaust-valve 26, and consequently but little strain will be exerted on the sprocket-chain and the various parts connected to the exhaust-valve. At the completion of the instroke of the piston there will always be more or less air between the piston and the inner end of the cylinder, this air following the piston as the latter moves outwardly on its suction-stroke. The outward movement of the piston further creates a partial vacuum within the cylinder and draws in the explosive compound in readiness for compression. The pressure within the cylinder at this time and during the whole of the outstroke is less than atmospheric pressure, so that at the limit of outstroke the opening of the port 90 will not result in the loss of any of the explosive mixture, but will permit the entrance of a small quantity of air to the cylinder. This opening by allowing the entrance of air prevents the heating of the cylinder and at the same time by permitting the escape of a quantity of the exploded gases reduces the power necessary to return the piston on the exhaust-stroke and the power neccessary to open the exhaust-valve. It will be observed that at the completion of the working stroke the products of combustion will pass through the opening or discharge-port 90, and said port is of sufficient area to permit practically the whole of the products of combustion to pass therethrough, so that there will be little or no gas escape through the main port 25, and this by reducing resistance to the back stroke of the piston will materially add to the power of the engine.

When the governor operates, the port 25 serves exclusively as an air-port, and while the port is open air will be drawn in during the outstroke of the piston and will be forced out through said opening during the return stroke of the said piston, the air absorbing the heat from the cylinder and piston and maintaining the cylinder at the comparatively low temperature necessary for proper working of the engine, and it is found in practice that this air-cooling is quite as effective as a water-jacket or other similar devices ordinarily employed.

Having thus described the invention, what is claimed is—

1. The combination in an explosive-engine, of the cylinder, inlet and exhaust valves, a spring normally closing the exhaust-valve, a revoluble shaft operated by the engine and having a crank, a lever for opening the exhaust-valve against the action of its spring, a connecting-rod secured at one end to the lever, an auxiliary rod carried by the crank and operatively connected to said connecting-rod, and a governor-actuated means for engaging the connecting-rod and preventing closing movement of the exhaust-valve.

2. The combination in an explosive-engine, of the cylinder, inlet and exhaust valves, a spring normally closing the exhaust-valve, a revoluble shaft operated by the engine and having a crank, a lever for opening the exhaust-valve against the action of its spring, a connecting-rod secured at one end to the lever, an arm arranged at the opposite end of said connecting-rod, an auxiliary rod carried by the crank and extending loosely through an opening in said arm to thereby permit return movement of the connecting-rod independent of the crank, and an adjustable block or nut carried by the auxiliary rod for timing the opening movement of the valve.

3. The combination in an explosive-engine, of the cylinder, inlet and exhaust valves, a spring normally closing the exhaust-valve, a revoluble shaft operated by the engine and having a crank, a lever for opening the exhaust-valve against the action of its spring, a connecting-rod secured at one end to the lever, a vertically-disposed arm at the opposite end of said connecting-rod, an auxiliary rod carried by the crank and extending loosely through an opening in said arm to thereby permit return movement of the connecting-rod independent of the crank, an adjustable block or nut carried by the auxiliary rod for timing the opening movement of the exhaust-valve, and an adjustable stud or pin extending through an opening in said arm and serving as a means for limiting the return movement of said connecting-rod.

4. The combination in an explosive-engine, of the cylinder, inlet and exhaust valves, a spring normally closing the exhaust-valve, a revoluble shaft operated by the lever and having a crank, a lever for opening the exhaust-valve, a connecting-rod secured at one end to the lever, a vertically-disposed arm at the opposite end of said connecting-rod, an auxiliary rod carried by the crank and extending loosely through an opening in said arm, an adjustable member carried by the auxiliary rod for timing the opening movement of the exhaust-valve, a governing device, and a spring-actuated arm controlled by the governor and adapted to engage the connecting-rod and maintain the same in valve-opening position.

5. The combination with an explosive-engine, of the cylinder, inlet and exhaust valves, a main crank-shaft, a balance-wheel mounted thereon, a centrifugal governor-arm carried by the balance-wheel and having an inclined portion at its free end, a counter-shaft receiving motion from the main shaft and provided with a crank, a lever pivoted near the inlet end of the cylinder and having one end adapted to engage the stem of the exhaust-valve, a connecting-rod leading from the opposite end of said lever toward the crank-shaft of the engine, a vertically-extending arm carried by the connecting-rod and having upper and lower openings, an adjustable guide-pin extending through the lower opening, an auxiliary rod leading from the cranked counter-shaft through said opening, an adjustable member carried by the auxiliary rod for engaging the arm and thus effecting the opening movement of the valve, a pin 52 projecting from the connecting-rod, and a spring-pressed lever having a fulcrum intermediate of its length and adapted to engage the pin, one end of said lever having a ring encircling the main shaft, said ring having an inclined face for engagement by the corresponding face of the governor-arm.

In testimony that we claim the foregoing as our own we have hereto affixed our signatures in the presence of two witnesses.

FRANK HARDENBROOK.
WILLIAM RICE.

Witnesses:
C. T. WHITESEL,
WILL TEETER.